(12) United States Patent
Brammer et al.

(10) Patent No.: US 10,792,652 B2
(45) Date of Patent: Oct. 6, 2020

(54) METHODS TO REJUVENATE A DEACTIVATED HYDROFORMYLATION CATALYST SOLUTION

(71) Applicant: Dow Technology Investments LLC, Midland, MI (US)

(72) Inventors: Michael A. Brammer, Freeport, TX (US); William N. Felsted, II, Lake Jackson, TX (US); Thomas C. Eisenschmid, South Charleston, WV (US)

(73) Assignee: Dow Technology Investments LLC, Midland, MI (US)

( * ) Notice: Subject to any disclaimer, the term of this patent is extended or adjusted under 35 U.S.C. 154(b) by 0 days.

(21) Appl. No.: 16/340,769

(22) PCT Filed: Nov. 6, 2017

(86) PCT No.: PCT/US2017/060092
§ 371 (c)(1),
(2) Date: Apr. 10, 2019

(87) PCT Pub. No.: WO2018/089284
PCT Pub. Date: May 17, 2018

(65) Prior Publication Data
US 2020/0047171 A1 Feb. 13, 2020

Related U.S. Application Data

(60) Provisional application No. 62/419,168, filed on Nov. 8, 2016.

(51) Int. Cl.
| | | |
|---|---|---|
| *B01J 31/40* | (2006.01) | |
| *B01J 31/24* | (2006.01) | |
| *B01J 38/52* | (2006.01) | |

(52) U.S. Cl.
CPC ....... *B01J 31/4053* (2013.01); *B01J 31/2409* (2013.01); *B01J 38/52* (2013.01); *B01J 2231/321* (2013.01); *B01J 2531/822* (2013.01)

(58) Field of Classification Search
CPC .... B01J 31/40; B01J 31/4053; B01J 31/2409; B01J 38/52; B01J 2231/321; B01J 2531/822
USPC ......................................................... 502/33
See application file for complete search history.

(56) References Cited

U.S. PATENT DOCUMENTS

| | | |
|---|---|---|
| 3,527,809 A | 9/1970 | Pruett et al. |
| 3,547,964 A | 12/1970 | Olivier |
| 4,021,463 A | 5/1977 | Kummer et al. |
| 4,108,905 A | 8/1978 | Wilkinson |
| 4,113,754 A | 9/1978 | Kummer et al. |
| 4,148,830 A | 4/1979 | Pruett et al. |
| 4,196,069 A | 4/1980 | Mose et al. |
| 4,221,743 A | 9/1980 | Halstead et al. |
| 4,247,486 A | 1/1981 | Brewester et al. |
| 4,277,627 A | 7/1981 | Bryant et al. |
| 4,297,239 A | 10/1981 | Bryant et al. |
| 4,329,507 A | 5/1982 | Takeda et al. |
| 4,374,278 A | 2/1983 | Bryant et al. |
| 4,400,547 A | 8/1983 | Dawes et al. |
| 4,518,809 A | 5/1985 | Forster et al. |
| 4,528,403 A | 7/1985 | Tano et al. |
| 4,537,997 A | 8/1985 | Kojima et al. |
| 4,605,780 A | 8/1986 | Billig et al. |
| 4,668,651 A | 5/1987 | Billig et al. |
| 4,774,361 A | 9/1988 | Maher et al. |
| 4,822,917 A | 4/1989 | Miyazawa et al. |
| 4,904,808 A | 2/1990 | Devon et al. |
| 5,102,505 A | 4/1992 | Sorensen |
| 5,105,018 A | 4/1992 | Miyazawa et al. |
| 5,110,990 A | 5/1992 | Blessing et al. |
| 5,288,918 A | 2/1994 | Maher et al. |
| 5,290,743 A | 3/1994 | Chang |
| 5,312,996 A | 5/1994 | Packett |
| 5,360,938 A | 11/1994 | Babin et al. |
| 5,367,106 A | 11/1994 | Unruh et al. |
| 5,430,194 A | 7/1995 | Barner et al. |
| 5,491,266 A | 2/1996 | Babin et al. |
| 5,681,473 A | 10/1997 | Miller et al. |
| 5,728,893 A | 3/1998 | Becker et al. |
| 5,731,472 A | 3/1998 | Leung et al. |
| 5,874,640 A | 2/1999 | Bryant et al. |
| 5,929,289 A | 7/1999 | Abatjoglou et al. |
| 5,936,130 A | 8/1999 | Mori et al. |
| 6,642,420 B1 | 11/2003 | Zehner et al. |
| 7,446,231 B2 | 11/2008 | Peterson et al. |
| 7,531,698 B2 | 5/2009 | Zhang et al. |
| 7,863,487 B2 | 1/2011 | Eisenschmid et al. |
| 8,389,774 B2 | 3/2013 | Becker et al. |
| 8,404,903 B2 | 3/2013 | Cox et al. |
| 9,067,876 B2 | 6/2015 | Becker et al. |
| 9,670,122 B2 | 6/2017 | Smith, III et al. |
| 9,688,598 B2 | 6/2017 | Eisenschmid et al. |
| 2006/0224000 A1 | 10/2006 | Papp et al. |
| 2009/0198071 A1 | 8/2009 | Zhang et al. |

FOREIGN PATENT DOCUMENTS

| | | |
|---|---|---|
| CN | 104248994 A | 12/2014 |
| WO | 88/08835 A1 | 11/1988 |

OTHER PUBLICATIONS

C. Chen et al., Organic Chemistry Frontiers, 2014, pp. 947-951, vol. 1.
C.K. Brown and G. Wilkinson, Journal of the Chemical Society, 1970, pp. 2753-2764.
PCT/US2017/060092, International Search Report and Written Opinion dated Jan. 31, 2018.
PCT/US2017/060092, International Preliminary Report on Patentability dated May 14, 2019.

*Primary Examiner* — Edward M Johnson

(57) ABSTRACT

Disclosed herein are methods to rejuvenate a deactivated hydroformylation catalyst solution wherein the solution comprises rhodium, polydentate phosphine ligands, and polydentate phosphine ligand degradation products. In one embodiment, such methods comprise adding a peroxide to the deactivated hydroformylation catalyst solution.

8 Claims, No Drawings

METHODS TO REJUVENATE A DEACTIVATED HYDROFORMYLATION CATALYST SOLUTION

FIELD

The present disclosure relates generally to methods for rejuvenating deactivated hydroformylation catalyst solutions and in particular, to methods for rejuvenating deactivated hydroformylation catalyst solutions comprising polydentate phosphine ligands.

BACKGROUND

Aldehydes can be prepared from olefins in a number of ways using hydroformylation. For example, olefins can be reacted with carbon monoxide and hydrogen in the presence of a polydentate phosphine-modified rhodium catalyst to produce aldehydes containing three to twenty-one carbon atoms.

Although the root causes vary, a steady loss of catalyst activity over time is an issue with hydroformylation processes. For example, rhodium processes promoted by triphenylphosphine (TPP) are known to suffer intrinsic deactivation due to rhodium clustering and the formation of inhibitory phosphorous compounds (see, e.g., U.S. Pat. Nos. 4,277,627 and 4,605,780). Likewise, rhodium-bisphophite catalysts are inhibited by phosphorous-containing degradation products as detailed in U.S. Pat. No. 5,874,640. Thus, discovering and employing an effective strategy to mitigate catalyst deactivation is an important aspect of hydroformylation process development.

Rhodium-polydentate phosphines are another type of hydroformylation catalyst where deactivation is an issue. There exists a need for a facile means to restore activity to a deactivated rhodium-polydentate phosphine hydroformylation catalyst.

SUMMARY

Disclosed in embodiments herein are methods to rejuvenate deactivated hydroformylation catalyst solutions.

In one embodiment, the present invention relates to a method to rejuvenate a deactivated hydroformylation catalyst solution comprising rhodium, polydentate phosphine ligands, and polydentate phosphine ligand degradation products, the method comprising adding a peroxide to the deactivated hydroformylation catalyst solution. In some embodiments, additional polydentate phosphine ligand can be added to the catalyst solution after the addition of peroxide.

These and other embodiments are described in more detail in the Detailed Description.

DETAILED DESCRIPTION

The methods disclosed herein are particularly suitable for use in hydroformylation processes utilizing polydentate phosphine ligands as part of the catalyst. Such hydroformylation processes comprise contacting CO, $H_2$, and at least one olefin under hydroformylation conditions sufficient to form at least one aldehyde product in the presence of a catalyst comprising, as components, a transition metal and a polydentate phosphine ligand.

All references to the Periodic Table of the Elements and the various groups therein are to the version published in the CRC Handbook of Chemistry and Physics, 72nd Ed. (1991-1992) CRC Press, at page I-11.

Unless stated to the contrary, or implicit from the context, all parts and percentages are based on weight and all test methods are current as of the filing date of this application. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

As used herein, "a", "an", "the", "at least one", and "one or more" are used interchangeably. The terms "comprises", "includes", and variations thereof do not have a limiting meaning where these terms appear in the description and claims. Thus, for example, an aqueous composition that includes particles of "a" hydrophobic polymer can be interpreted to mean that the composition includes particles of "one or more" hydrophobic polymers.

Also herein, the recitations of numerical ranges by endpoints include all numbers subsumed in that range (e.g., 1 to 5 includes 1, 1.5, 2, 2.75, 3, 3.80, 4, 5, etc.). For the purposes of the invention, it is to be understood, consistent with what one of ordinary skill in the art would understand, that a numerical range is intended to include and support all possible subranges that are included in that range. For example, the range from 1 to 100 is intended to convey from 1.01 to 100, from 1 to 99.99, from 1.01 to 99.99, from 40 to 60, from 1 to 55, etc. Also herein, the recitations of numerical ranges and/or numerical values, including such recitations in the claims, can be read to include the term "about." In such instances the term "about" refers to numerical ranges and/or numerical values that are substantially the same as those recited herein.

As used herein, the term "ppmw" means parts per million by weight.

For purposes of this invention, the term "hydrocarbon" is contemplated to include all permissible compounds having at least one hydrogen and one carbon atom. Such permissible compounds may also have one or more heteroatoms. In a broad aspect, the permissible hydrocarbons include acyclic (with or without heteroatoms) and cyclic, branched and unbranched, carbocyclic and heterocyclic, aromatic and nonaromatic organic compounds that can be substituted or unsubstituted.

As used herein, the term "substituted" is contemplated to include all permissible substituents of organic compounds unless otherwise indicated. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxyalkyl, aminoalkyl, in which the number of carbons can range from 1 to 20 or more, preferably from 1 to 12, as well as hydroxy, halo, and amino. The permissible substituents can be one or more and the same or different for appropriate organic compounds. This invention is not intended to be limited in any manner by the permissible substituents of organic compounds.

As used herein, the term "hydroformylation" is contemplated to include, but not limited to, all permissible asymmetric and non-asymmetric hydroformylation processes that involve converting one or more substituted or unsubstituted olefinic compounds or a reaction mixture comprising one or more substituted or unsubstituted olefinic compounds to one or more substituted or unsubstituted aldehydes or a reaction mixture comprising one or more substituted or unsubstituted aldehydes.

The terms "reaction fluid", "reaction medium", "process fluid" and "catalyst solution" are used interchangeably herein, and may include, but are not limited to, a mixture comprising: (a) a metal-organophosphorous ligand complex catalyst, (b) free organophosphorous ligand, (c) aldehyde product formed in the reaction, (d) unreacted reactants, (e) a solvent for said metal-organophosphorous ligand complex catalyst and said free organophosphorous ligand, and, optionally, (f) organophosphorous ligand decomposition products such as the corresponding oxide. The reaction fluid can encompass, but is not limited to, (a) a fluid in a reaction zone, (b) a fluid stream on its way to a separation zone, (c) a fluid in a separation zone, (d) a recycle stream, (e) a fluid withdrawn from a reaction zone or separation zone, (f) a withdrawn fluid being treated with an aqueous buffer solution, (g) a treated fluid returned to a reaction zone or separation zone, (h) a fluid in an external cooler, and (i) ligand decomposition products and their salts.

The terms "ligand decomposition products" and "ligand degradation products" are used interchangeably herein and are contemplated to include, but not limited to, small phosphorous compounds produced by rhodium-catalyzed side reactions of the parent ligand, as well as partially oxidized polydentate phosphine.

Disclosed herein are methods to rejuvenate a deactivated hydroformylation catalyst solution wherein the solution comprises rhodium, polydentate phosphine ligands, and polydentate phosphine ligand degradation products. In some embodiments, such methods comprise adding a peroxide to the deactivated hydroformylation catalyst solution. In some embodiments, additional polydentate phosphine ligand is added to the catalyst solution after the addition of peroxide.

The terms 'aldehyde product, "desired aldehyde product", "product aldehyde" and "product aldehyde(s)" are used interchangeably and are contemplated to include the aldehyde(s) produced on-purpose from the hydroformylation reaction. Examples of such product aldehydes include propionaldehyde (produced from ethylene), butyraldehyde (produced from propylene) and valeraldehyde (produced from 1-butene or mixed butenes). In some embodiments, the deactivated hydroformylation catalyst solution further comprises at least one product aldehyde. In some such embodiments, a majority of the product aldehyde can be removed prior to adding the peroxide. The product aldehyde can be removed, in some embodiments by vaporization.

In some embodiments, the deactivated hydroformylation catalyst solution is at ambient temperature when the peroxide is added. In some embodiments, the temperature of the deactivated hydroformylation catalyst solution is between 0° C. and 40° C. when the peroxide is added. In some embodiments, the deactivated hydroformylation catalyst solution is at a temperature of 70° C. or greater when the peroxide is added. The deactivated hydroformylation catalyst solution is at a temperature of 100° C. or greater when the peroxide is added in some embodiments. In some embodiments, the deactivated hydroformylation catalyst solution is at a temperature of 110° C. or greater when the peroxide is added. The deactivated hydroformylation catalyst solution is at a temperature of 115° C. or greater when the peroxide is added in some embodiments.

The peroxide, in some embodiments, comprises hydrogen peroxide, peroxy esters, peroxydicarbonates, dialkyl peroxides, hydroperoxides, peroxyketals, or a combination thereof.

Hydrogen and carbon monoxide may be obtained from any suitable source, including petroleum cracking and refinery operations. Syngas mixtures are a preferred source of hydrogen and CO.

Syngas (from synthesis gas) is the name given to a gas mixture that contains varying amounts of CO and $H_2$. Production methods are well known. Hydrogen and CO typically are the main components of syngas, but syngas may contain $CO_2$ and inert gases such as $N_2$ and Ar. The molar ratio of $H_2$ to CO varies greatly but generally ranges from 1:100 to 100:1 and preferably between 1:10 and 10:1. Syngas is commercially available and is often used as a fuel source or as an intermediate for the production of other chemicals. The most preferred $H_2$:CO molar ratio for chemical production is between 3:1 and 1:3 and usually is targeted to be between about 1:2 and 2:1 for most hydroformylation applications.

As used herein, "organic peroxides" refer to organic compounds containing at least one peroxide group (ROOR'), wherein at least one of R and R' comprises a carbon atom, and R and R' may or may not be the same. Illustrative families and compounds include peroxy esters (e.g. t-butylperbenzoate), peroxydicarbonates (e.g. di-2-ethylhexyl peroxydicarbonate), dialkyl peroxides (e.g. di-t-butyl peroxides), hydroperoxides (e.g. t-butyl hydroperoxide) and peroxyketals (e.g. 1,1'di(t-butyl peroxy)-3,3,5-trimethylcyclohexane).

As used herein, "peroxides" include hydrogen peroxide, organic peroxides, and mixtures thereof.

The substituted or unsubstituted olefinic unsaturated reactants that may be employed in the hydroformylation process include both optically active (prochiral and chiral) and non-optically active (achiral) olefinic unsaturated compounds containing from 2 to 40, preferably 3 to 20, carbon atoms. These compounds are described in detail in U.S. Pat. No. 7,863,487. Such olefinic unsaturated compounds can be terminally or internally unsaturated and be of straight-chain, branched chain or cyclic structures, as well as olefin mixtures, such as obtained from the oligomerization of propene, butene, isobutene, etc. (such as so called dimeric, trimeric or tetrameric propylene and the like, as disclosed, for example, in U.S. Pat. Nos. 4,518,809 and 4,528,403).

Prochiral and chiral olefins useful in the asymmetric hydroformylation that can be employed to produce enantiomeric aldehyde mixtures include those represented by the formula:

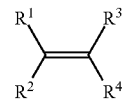

wherein $R^1$, $R^2$, $R^3$ and $R^4$ are the same or different (provided that $R^1$ is different from $R^2$ or $R^3$ is different from $R^4$) and are selected from hydrogen; alkyl; substituted alkyl, said substitution being selected from dialkylamino such as benzylamino and dibenzylamino, alkoxy such as methoxy and ethoxy, acyloxy such as acetoxy, halo, nitro, nitrile, thio, carbonyl, carboxamide, carboxaldehyde, carboxyl, and carboxylic ester; aryl including phenyl; substituted aryl including phenyl, said substitution being selected from alkyl, amino including alkylamino and dialkylamino such as benzylamino and dibenzylamino, hydroxy, alkoxy such as methoxy and ethoxy, acyloxy such as acetoxy, halo, nitrile, nitro, carboxyl, carboxaldehyde, carboxylic ester, carbonyl, and thio; acyloxy such as acetoxy; alkoxy such as methoxy and ethoxy; amino including alkylamino and dialkylamino such as benzylamino and dibenzylamino; acylamino and diacylamino such as acetylbenzylamino and diacetylamino; nitro; carbonyl; nitrile; carboxyl; carboxamide; carboxaldehyde; carboxylic ester; and alkylmercapto such as methylmercapto. It is understood that the prochiral and chiral olefins of this definition also include molecules of the above general formula where the R groups are connected to form ring compounds, e.g., 3-methyl-1-cyclohexene, and the like.

Illustrative optically active or prochiral olefinic compounds useful in asymmetric hydroformylation are described, for example, in U.S. Pat. Nos. 4,329,507, 5,360,938 and 5,491,266.

A solvent advantageously is employed in the hydroformylation process. Any suitable solvent that does not unduly interfere with the hydroformylation process can be used. By way of illustration, suitable solvents for rhodium catalyzed hydroformylation processes include those disclosed, for example, in U.S. Pat. Nos. 3,527,809; 4,148,830; 5,312,996; and 5,929,289. Non-limiting examples of suitable solvents include saturated hydrocarbons (alkanes), aromatic hydrocarbons, water, ethers, aldehydes, ketones, nitriles, alcohols, esters, and aldehyde condensation products. Specific examples of solvents include: tetraglyme, pentanes, cyclohexane, heptanes, benzene, xylene, toluene, diethyl ether, tetrahydrofuran, butyraldehyde, and benzonitrile. The organic solvent may also contain dissolved water up to the saturation limit. Illustrative preferred solvents include ketones (e.g. acetone and methylethyl ketone), esters (e.g. ethyl acetate, di-2-ethylhexyl phthalate, 2,2,4-trimethyl-1,3-pentanediol monoisobutyrate), hydrocarbons (e.g. toluene), nitrohydrocarbons (e.g., nitrobenzene), ethers (e.g., tetrahydrofuran (THF)) and sulfolane. In rhodium catalyzed hydroformylation processes, it may be preferred to employ, as a primary solvent, aldehyde compounds corresponding to the aldehyde products desired to be produced and/or higher boiling aldehyde liquid condensation by-products, for example, as might be produced in situ during the hydroformylation process, as described for example in U.S. Pat. Nos. 4,148,830 and 4,247,486. The primary solvent will normally eventually comprise both aldehyde products and higher boiling aldehyde liquid condensation by-products ("heavies"), due to the nature of the continuous process. The amount of solvent is not especially critical and need only be sufficient to provide the reaction medium with the desired amount of transition metal concentration. Typically, the amount of solvent ranges from about 5 percent to about 95 percent by weight, based on the total weight of the reaction fluid. Mixtures of solvents may be employed.

Methods of the present invention, in some embodiments, are particularly useful in rejuvenating hydroformylation catalyst solutions wherein the hydroformylation catalyst is a metal-polydentate phosphine catalyst. In general, metal-polydentate phosphine catalysts may be preformed or formed in situ, and comprise a metal precursor in combination with a polydentate phosphine ligand, carbon monoxide and optionally hydrogen. The catalyst complex may be present in mononuclear, dinuclear and/or higher nuclearity forms. However, the exact structure of the catalyst is not known.

The metal-polydentate phosphine ligand complex catalyst can be optically active or non-optically active. The metals can include Group 8, 9 and 10 metals selected from rhodium (Rh), cobalt (Co), iridium (Ir), ruthenium (Ru), iron (Fe), nickel (Ni), palladium (Pd), platinum (Pt), osmium (Os) and mixtures thereof, with the preferred metals being rhodium, cobalt, iridium and ruthenium, more preferably rhodium, cobalt and ruthenium, especially rhodium. Mixtures of these metals may be used. The permissible polydentate phosphine ligands that make up the metal-polydentate phosphine ligand complexes and free polydentate phosphine ligand include di-, tri-, tetra-, and higher polyorganophosphorus compounds. Mixtures of ligands may be employed in the metal-polydentate phosphine ligand complex catalyst and/or free ligand, and such mixtures may be the same or different.

The polydentate phosphine compounds that may serve as the ligand of the metal-polydentate phosphine ligand complex catalyst and/or free ligand may be of the achiral (optically inactive) or chiral (optically active) type and are well known in the art. Achiral polydentate phosphine ligands are preferred.

The polydentate phosphine ligand, for which the methods of the present invention are particularly well-suited, is a compound that contains at least two tri-valent phosphorous atoms capable of complexing the transition metal in a chelating fashion.

The polydentate phosphine ligand employable in the methods of this disclosure comprises any organic compound comprising at least two phosphorus atoms covalently bonded to three aryl, alkyl, or arylalkyl radicals, or combinations thereof. A mixture of polydentate phosphine ligands may also be employed.

Representative suitable polydentate phosphine ligands include those having the formula of Formula I, II or III:

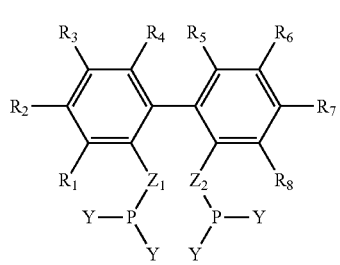

Formula I

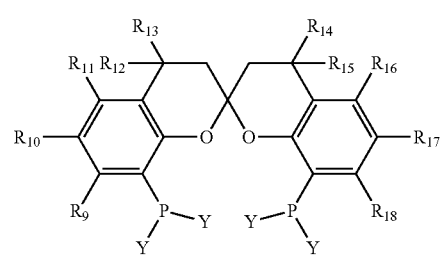

Formula II

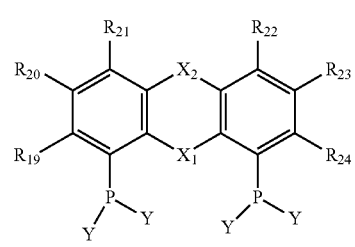

Formula III in which P represents a phosphorous atom, and each of $R_1$-$R_{24}$ are independently a hydrogen, a hydrocarbyl group, an aromatic ring, a heteroaromatic ring or a halogen atom, or a heterocarbyl group selected from the groups consisting of $NR_2$, OR and SR, where R is a hydrocarbyl group of $C_1$ to $C_{20}$, or heterohydrocarbyl group having 1 to 20 atoms, each independently selected from C or a heteroatom, wherein each heteroatom is independently O, S, Si, Ge, P, or N, and may themselves be substituted or unsubstituted as required by the valency of the heteroatom. $R_1$ to $R_{24}$ may optionally comprise cycloaliphatic or aryl groups fused to the biaryl moiety such as:

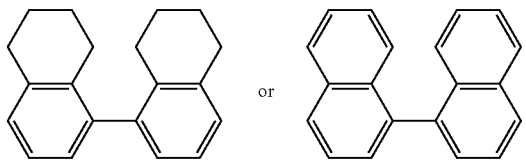

For Formula I, II, or III, each aryl, heteroaryl, hydrocarbyl, heterohydrocarbyl, hydrocarbylene, and heterohydrocarbylene group independently is unsubstituted or substituted with one or more substituents $R^v$. Each $R^v$ independently is a halogen atom, polyfluoroalkyl substitution, unsubstituted $C_1$ to $C_{18}$ alkyl, $F_3C-$, $FCH_2O-$, $F_2HCO-$, $F_3CO-$, $R_3Si$, $R_3Ge$, RO, RS, RS(O), $RS(O)_2$, $R_2P$, $R_2N$, $R_2C=N$, NC, RC(O)O, ROC(O), RC(O)N(R), or $R_2NC(O)$, or two of the $R^v$ are taken together to form an un unsubstituted $C_1$ to $C_{18}$ alkylene, wherein each R independently is an unsubstituted $C_1$ to $C_{18}$ alkyl. Optionally, two of the $R^v$ are taken together to form a ring, where the ring can be cyclic or polycyclic.

For Formula I, $Z_1$ and $Z_2$ are $CH_2$ groups; such structures, as well as others that can be used in the methods described herein, can be found U.S. Pat. No. 4,904,808 which is hereby incorporated by reference.

For Formula III, $X_1$ is $CH_2$ or O, while $X_2$ is O or $C(R_{25})_2$, and each $R_{25}$ may be the same or different and is a hydrogen, a cycloaliphatic group, an aromatic ring, a heteroaromatic ring or a halogen atom, or a heterocarbyl group selected from the groups consisting of $NR_2$, OR and SR, where R is a hydrocarbyl group of $C_1$ to $C_{20}$, or heterohydrocarbyl group having 1 to 20 atoms, each independently selected from C or a heteroatom, wherein each heteroatom is independently O, S, Si, Ge, P, or N, and may themselves be substituted or unsubstituted as required by the valency of the heteroatom. Two $R_{25}$ groups may combine in a fused ring. Y is a an aromatic ring or a heteroaromatic ring, and may be substituted or unsubstituted.

In some embodiments, instead of including both $X_1$ and $X_2$, Formula III may include only one of $X_1$ and $X_2$, but not both. In such embodiments, when only one of $X_1$ or $X_2$ is present, the carbon valences are satisfied by hydrogen.

Additional representative suitable polydentate phosphine ligands include those having the Formula IV:

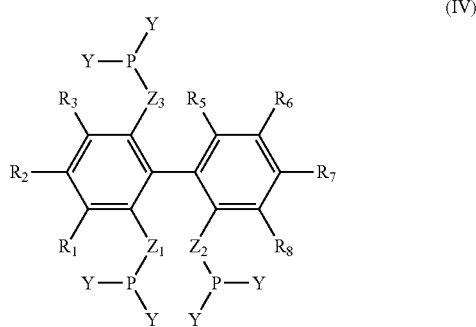

wherein $Z_3$ is a $CH_2$ group; such structures, as well as others that can be used in the methods described herein, can be found for example in Org. Chem. Frontiers., 2014, 1, 947-951, which is hereby incorporated by reference.

Additional representative suitable polydentate phosphine ligands include those having the Formula V:

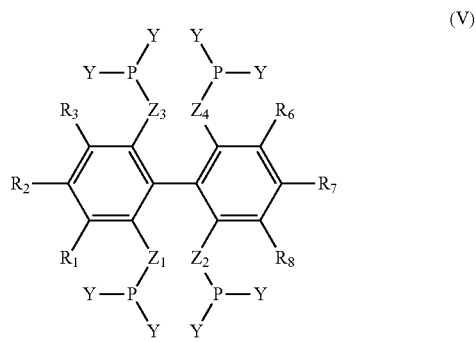

wherein $Z_4$ is a $CH_2$ group; such structures, as well as others that can be used in the methods described herein, can be found for example in U.S. Pat. No. 7,531,698, which is hereby incorporated by reference.

Methods of the present invention are particularly adapated for rejuvenating catalyst solutions where the catalyst comprises rhodium complexed with one or more of the polydentate phosphine ligands referenced above. The rhodium complex may additionally contain any or all of olefin, hydrogen, and carbon monoxide. For example, the resting state of a catalyst may comprise the rhodium-ligand dicarbonyl hydride complex.

In absolute terms the rhodium concentration in the liquid body can range from about 25 ppm to about 1200 ppm of rhodium calculated as free metal. Analytical techniques for measuring rhodium concentration are well known to the skilled person, and include atomic absorption (AA), inductively coupled plasma (ICP) and X-ray fluorescence (XRF); AA is typically preferred.

In general, the optimum catalyst concentration will depend on the olefin substrate employed. For example, it is well known that the hydroformylation rate for internal and branched internal olefins is slower than for linear alpha olefins, such that more catalyst will be required to achieve the desired conversion in those cases. For industrial processes, economic considerations require that the olefin conversion be as high as practical; thus engineering designs and process parameters—including catalyst concentration—must be adjusted accordingly.

The metal-polydentate phosphine ligand complex catalysts may be in homogeneous or heterogeneous form. For instance, preformed rhodium hydrido-carbonyl-polydentate phosphine ligand catalysts may be prepared and introduced into a hydroformylation reaction mixture. More preferably, the rhodium-polydentate phosphine ligand complex catalysts can be derived from a rhodium catalyst precursor that may be introduced into the reaction medium for in situ formation of the active catalyst. For example, rhodium catalyst precursors such as rhodium dicarbonyl acetylacetonate, $Rh_2O_3$, $Rh_4(CO)_{12}$, $Rh_6(CO)_{16}$, $Rh(NO_3)_3$ and the like may be introduced into the reaction mixture along with the polydentate phosphine ligand for the in situ formation of the active catalyst. In a preferred embodiment, rhodium dicarbonyl acetylacetonate is employed as a rhodium precursor and reacted in the presence of a solvent with the polydentate phosphine ligand to form a catalytic rhodium-polydentate phosphine ligand complex precursor that is introduced into the reactor along with excess (free) polydentate phosphine ligand for the in situ formation of the active catalyst. In any event, it is sufficient that carbon monoxide, hydrogen and the polydentate phosphine ligand are all ligands that are capable of being complexed with the metal and that an active metal-polydentate phosphine ligand catalyst is present in the reaction mixture under the conditions used in the hydroformylation reaction. Carbonyl, hydride, and polydentate phosphine ligands may be complexed to the rhodium either prior to or in situ during the hydroformylation process.

The preferred catalyst precursor composition can be prepared by forming a solution of rhodium dicarbonyl acetylacetonate, an organic solvent and a polydentate phosphine ligand. The polydentate phosphine ligand readily replaces at least one of the carbonyl ligands of the rhodium acetylacetonate complex precursor as witnessed by the evolution of carbon monoxide gas.

Accordingly, the metal-organophosphorus ligand complex catalyst advantageously comprise the metal complexed with carbon monoxide and a polydentate phosphine ligand, said ligand being bonded (complexed) to the metal in a chelated and/or non-chelated fashion.

In addition to the metal-polydentate phosphine ligand complex catalyst, free polydentate phosphine ligand (i.e., ligand that is not complexed with the metal) may also be present in the reaction medium. The significance of free ligand is taught in U.S. Pat. No. 3,527,809, GB 1,338,225, and Brown et al., "Homogeneous Hydroformylation of Alkenes with Hydridocarbonyltris(triphyenylphosphine) rhodium(I) as Catalyst," *Journal of the Chemical Society*, 1970, pages 2759 and 2761. The free polydentate phosphine ligand may correspond to any of the above-defined polydentate phosphine ligands discussed above. It is preferred that the free polydentate phosphine ligand be the same as the polydentate phosphine ligand of the metal-polydentate phosphine ligand complex catalyst employed. However, such ligands need not be the same in any given process. The hydroformylation process of this invention may involve from 0.1 moles or less to 10 moles or higher of free polydentate phosphine ligand per mole of metal in the reaction medium. Preferably, the hydroformylation process is carried out in the presence of from 1 to 5 moles of polydentate phosphine ligand per mole of metal present in the reaction medium. More preferably, for polydentate phosphine ligand, from 1 to 3 moles of polydentate phosphine ligand are employed per mole of metal. Said amounts of polydentate phosphine ligand are the sum of both the amount of polydentate phosphine ligand that is bound (complexed) to the metal present and the amount of free polydentate phosphine ligand present. If desired, additional polydentate phosphine ligand can be supplied to the reaction medium of the hydroformylation process at any time and in any suitable manner, e.g. to maintain a predetermined level of free ligand in the reaction medium.

Hydroformylation processes, and conditions for their operation, are well known. The hydroformylation processes may be asymmetric or non-asymmetric, the preferred processes being non-asymmetric, and may be conducted in any batch, continuous or semi-continuous fashion and may involve any catalyst liquid and/or gas recycle operation desired. Thus, it should be clear that the particular hydroformylation process for producing such aldehydes from an olefinic unsaturated compound, as well as the reaction conditions and ingredients of the hydroformylation process are not critical features of this invention other than the polydentate organophosphine employed in the process.

The liquid recycle procedure generally involves withdrawing a portion of the liquid reaction medium containing the catalyst and aldehyde product from the hydroformylation reactor, i.e., reaction zone, either continuously or intermittently, and recovering the aldehyde product therefrom by use of a composite membrane, such as disclosed in U.S. Pat. Nos. 5,430,194 and 5,681,473, or by the more conventional and preferred method of distilling it, i.e. vaporization separation, in one or more stages under normal, reduced or elevated pressure, as appropriate, in a separate distillation zone, the non-volatilized metal catalyst containing residue being recycled to the reaction zone as disclosed, for example, in U.S. Pat. No. 5,288,918. Condensation of the volatilized materials, and separation and further recovery thereof, e.g., by further distillation, can be carried out in any conventional manner, the crude aldehyde product can be passed on for further purification and isomer separation, if desired, and any recovered reactants, e.g., olefinic starting material and syngas, can be recycled in any desired manner to the hydroformylation zone (reactor). The recovered metal catalyst containing raffinate of such membrane separation or recovered non-volatilized metal catalyst containing residue of such vaporization separation can be recycled, to the hydroformylation zone (reactor) in any conventional manner desired.

In a preferred embodiment, the hydroformylation reaction fluid includes any fluid derived from any corresponding hydroformylation process that contains at least some amount of four different main ingredients or components, i.e., the aldehyde product, a metal-polydentate phosphine ligand complex catalyst, free polydentate phosphine ligand and a solvent for said catalyst and said free ligand. The hydroformylation reaction mixture compositions can and normally will contain additional ingredients such as those that have either been deliberately employed in the hydroformylation process or formed in situ during said process. Examples of such additional ingredients include unreacted olefin starting material, carbon monoxide and hydrogen gases, and in situ formed by-products, such as saturated hydrocarbons and/or unreacted isomerized olefins corresponding to the olefin starting materials, ligand degradation compounds, and high boiling liquid aldehyde condensation by-products, as well as other inert co-solvent type materials or hydrocarbon additives, if employed.

The reaction conditions of the hydroformylation process may include any suitable type hydroformylation conditions heretofore employed for producing optically active and/or non-optically active aldehydes. The hydroformylation reaction conditions employed will be governed by the type of aldehyde product desired. For instance, the total gas pressure of hydrogen, carbon monoxide and olefin starting compound of the hydroformylation process may range from 1 to 69,000 kPa. In general, however, it is preferred that the process be operated at a total gas pressure of hydrogen, carbon monoxide and olefin starting compound of less than 14,000 kPa and more preferably less than 3,400 kPa. The minimum total pressure is limited predominantly by the amount of reactants necessary to obtain a desired rate of reaction. More specifically, the carbon monoxide partial pressure of the hydroformylation process is preferably from 1 to 6,900 kPa, and more preferably from 21 to 5,500 kPa, while the hydrogen partial pressure is preferably from 34 to 3,400 kPa and more preferably from 69 to 2,100 kPa. In general, the molar ratio of gaseous $H_2$:CO may range from 1:10 to 100:1 or higher, the more preferred molar ratio being from 1:10 to 10:1.

In general, the hydroformylation process may be conducted at any operable reaction temperature. Advantageously, the hydroformylation process is conducted at a reaction temperature from −25° C. to 200° C., preferably from 50° C. to 120° C.

The hydroformylation process may be carried out using equipment and systems known to those of skill in the art. Examples of such equipment and systems can be found in U.S. Pat. Nos. 4,247,486, 5,105,018, 5,367,106, 6,642,420, 7,446,231, 8,389,774, 8,404,903 and 9,067,876, and in PCT Publication Nos. WO2015/047723, WO2015/094781, which are hereby incorporated by reference.

In one embodiment, the hydroformylation process useful in this invention may be carried out in a multistaged reactor such as described, for example, in U.S. Pat. No. 5,728,893. Such multistaged reactors can be designed with internal, physical barriers that create more than one theoretical reactive stage per vessel.

It is generally preferred to carry out the hydroformylation process in a continuous manner. Continuous hydroformylation processes are well known in the art. The continuous process can be carried out in a single pass mode, i.e., wherein a vaporous mixture comprising unreacted olefinic starting material(s) and vaporized aldehyde product is removed from the liquid reaction mixture from whence the aldehyde product is recovered and make-up olefinic starting material(s), carbon monoxide and hydrogen are supplied to the liquid reaction medium for the next single pass through without recycling the unreacted olefinic starting material(s). Such types of recycle procedure are well known in the art and may involve the liquid recycling of the metal-polydentate phosphine complex catalyst fluid separated from the desired aldehyde reaction product(s), such as disclosed, for example, in U.S. Pat. No. 4,148,830 or a gas recycle procedure such as disclosed, for example, in U.S. Pat. No. 4,247,486, as well as a combination of both a liquid and gas recycle procedure if desired. The most preferred hydroformylation process comprises a continuous liquid catalyst recycle process. Suitable liquid catalyst recycle procedures are disclosed, for example, in U.S. Pat. Nos. 4,668,651; 4,774,361; 5,102,505 and 5,110,990.

In one embodiment, the aldehyde product mixtures may be separated from the other components of the crude reaction mixtures in which the aldehyde mixtures are produced by any suitable method such as, for example, solvent extraction, crystallization, distillation, vaporization, wiped film evaporation, falling film evaporation, phase separation, filtration, or any combination thereof. It may be desired to remove the aldehyde products from the crude reaction mixture as they are formed through the use of trapping agents as described in WO 88/08835. One method for separating the aldehyde mixtures from the other components of the crude reaction mixtures is by membrane separation, which is described, for example in U.S. Pat. Nos. 5,430,194 and 5,681,473.

As indicated above, product aldehyde(s) may be recovered from the reaction mixtures. For example, the recovery techniques disclosed in U.S. Pat. Nos. 4,148,830 and 4,247,486 can be used. For instance, in a continuous liquid catalyst recycle process the portion of the liquid reaction mixture (containing aldehyde product, catalyst, etc.), i.e., reaction fluid, removed from the reaction zone can be passed to a separation zone, e.g., vaporizer/separator, wherein the product aldehyde(s) can be separated via distillation, in one or more stages, under normal, reduced or elevated pressure, from the liquid reaction fluid, condensed and collected in a product receiver, and further purified if desired. The remaining non-volatilized catalyst containing liquid reaction mixture may then be recycled back to the reactor as may if desired any other volatile materials, e.g., unreacted olefin, together with any hydrogen and carbon monoxide dissolved in the liquid reaction after separation thereof from the condensed aldehyde product, e.g., by distillation in any conventional manner. In general, it is preferred to separate the product aldehyde(s) from the catalyst-containing reaction mixture under reduced pressure and at low temperatures so as to avoid possible degradation of the polydentate phosphine ligand and reaction products.

More particularly, distillation and separation of the desired aldehyde product from the metal-polydentate phosphine complex catalyst containing reaction fluid may take place at any suitable temperature desired. In general, it is preferred that such distillation take place at relatively low temperatures, such as below 150° C., and more preferably at a temperature in the range of from 50° C. to 140° C. It is also generally preferred that such aldehyde distillation take place under reduced pressure, e.g., a total gas pressure that is substantially lower than the total gas pressure employed during hydroformylation when low boiling aldehydes (e.g., $C_4$ to $C_6$) are involved or under vacuum when high boiling aldehydes (e.g. $C_7$ or greater) are involved. For instance, a common practice is to subject the liquid reaction product medium removed from the hydroformylation reactor to a pressure reduction so as to volatilize a substantial portion of the unreacted gases dissolved in the liquid medium that now contains a much lower synthesis gas concentration than is present in the reaction medium to the distillation zone, e.g. vaporizer/separator, wherein the desired aldehyde product is distilled. In general, distillation pressures ranging from vacuum pressures on up to total gas pressure of 340 kPa should be sufficient for most purposes.

Once catalyst activity has declined to less than desirable levels, the catalyst solution can be rejuvenated using embodiments of the present invention. For example, catalyst activity may be less than desirable when the hydroformylation reaction rate has decreased such that a hydroformylation reactor is not reaching production targets. In general, the catalyst solution can be rejuvenated by the addition of (1) a peroxide solution, followed by, optionally (2) fresh polydentate phosphine ligand.

In some embodiments of the present invention, the hydroformylation rate of a partially deactivated catalyst solution may be improved while the process remains in operation. Such an embodiment may be attractive to commercial operations where a plant shut-down to change out or treat the catalyst would have a negative economic impact. Other embodiments of the present invention require a suspension of operation, but will restore the hydroformylation rate to near that of a fresh, fully active catalyst. Most industrial plants are shut down occasionally for maintenance; performing such an embodiment during a planned shut down would thus represent a cost-effective option. The manner in which the process of the invention is conducted is determined, in part, by the state of the facility (i.e. operating or idle) at the time of the procedure.

In some embodiments, one or more portions of a dilute peroxide solution may be added directly to the hydroformylation process fluid under hydroformylation reaction conditions. The progress of the rejuvenation may be measured by the decline in the concentration of phosphine compounds and/or by the resulting increase in hydroformylation rate. Analytical techniques for quantifying polydentate phosphine ligands and their associated byproducts are well known to the skilled person, and include Nuclear Magnetic Resonance Spectroscopy of phosphorous nuclei ($^{31}P$ NMR) and High Performance Liquid Chromatography (HPLC). In such an embodiment, multiple portions of dilute peroxide may be added; fresh polydentate phosphine ligand may also be added to the process as necessary.

In other embodiments, the catalyst solution is concentrated prior to the treatment of the invention. This is accomplished by turning off the olefin, carbon monoxide and hydrogen feeds while continuing to maintain process temperatures. The catalyst solution is passed through the vaporizer until the product aldehyde is substantially removed; this determination may be made by monitoring the production rate (e.g. when the rate of product aldehyde collecting in the product tank is about 5-10% of normal operation). Once the product aldehyde has been substantially removed, the peroxide solution is added to the concentrated catalyst solution at elevated temperature. The peroxide may be added at temperatures of 70° C. or greater in some embodiments, 100° C. or greater in some embodiments, 110° C. or greater in some embodiments, 115° C. or greater in some embodiments, 70-120° C. in some embodiments, 80-110° C. in some embodiments, and in other embodiments at 90-100° C.

In another embodiment, the process of the invention may be conducted within the hydroformylation process equipment during suspension of operation, but without pre-concentrating the hydroformylation process fluid. For example, the olefin, carbon monoxide and hydrogen feeds are turned off, the process temperatures lowered, and the peroxide solution is added to the hydroformylation process fluid at near ambient temperature. In some such embodiments, the temperature of the deactivated hydroformylation catalyst solution is between 0° C. and 40° C. when the peroxide is added. The resulting catalyst solution-peroxide mixture is circulated or stirred for a period of 1-7 days or in some embodiments, for a period of 2-6 days. Process temperatures and gas feeds are then reestablished to resume hydroformylation.

It is understood that an aspect of the present invention is the addition of an appropriate amount of peroxide solution to a catalyst solution comprised of rhodium and a polydentate phosphine ligand. The amount of peroxide to be added depends largely on which embodiment of the invention is employed; that is to say whether the treatment is performed on a running hydroformylation process or on a catalyst solution during a plant shut-down.

For embodiments in a running hydroformylation process, the molar equivalents of peroxide added should be less than the calculated/estimated molar equivalents of phosphine, such as about 0.10 to 0.80 molar equivalents of peroxide per mole of phosphine in some embodiments, about 0.20 to 0.60 molar equivalents in some embodiments, and about 0.25-0.50 molar equivalents in some embodiments.

For embodiments performed with the hydroformylation process in an idle state, the molar equivalents of peroxide should approach or slightly exceed the calculated/estimated molar equivalents of phosphine. In some embodiments, the molar equivalents of peroxide are about 0.25 to 1.5 molar equivalents of peroxide per mole of phosphine, about 0.50 to 1.3 molar equivalents in some embodiments, and about 0.7 to 1.1 molar equivalents in some embodiments.

In some embodiments, the molar phosphine concentration of the catalyst solution may be estimated based on the total phosphorous content of the solution. Analytical means for determining phosphorous content are well known to the skilled person, and include Gas Chromatography with nitrogen-phosphorous detectors, (GC-NPD), Atomic Absorption (AA) and X-ray fluorescence (XRF). Due to the ease of operation and lack of need for sample preparation, XRF is preferred. The XRF analysis can be performed directly on the sample without dilution or additional preparation; a semi-quantitative measurement (precision ±20%) may be readily obtained without calibration and is sufficient for the procedure of the invention.

While the total phosphorous concentration is indicative of the concentration of phosphine compounds, it should be anticipated that an aged catalyst solution will contain a plurality of decomposition products including phosphine oxides which will somewhat obfuscate analytical measurements. While the amount of peroxide to be added is an important aspect, the present invention is tolerant of slight variations, and as such basing the amount of peroxide to be added on the molar concentration of phosphorous is a suitable means of carrying out the invention.

In some embodiments, the amount of peroxide to be added is calculated by estimating the molar concentration of phosphine compounds based on polydentate phosphine ligand concentration. In commercial hydroformylation processes, the concentration of the ligand employed and many of its associated decomposition products are routinely determined through at least one analytical method, including but not limited to $^{31}$P NMR and HPLC. Due to simplicity of operation, HPLC is typically preferred. In such an embodiment, once the concentration of ligand and byproducts are known, a reasonable estimate of the molar concentration of the phosphine compounds may be made, and an appropriate amount of peroxide added. The post-treatment solution may then be analyzed to confirm the desired decline in phosphine compound concentration. Based on the post-treatment analytical results, additional peroxide may be added if desired.

While peroxides are known to decompose at elevated temperature, in some embodiments it may be desirable to determine the post-oxidation concentration of peroxide by analysis. Methods for analyzing peroxide content in organic solutions are known and include, but are not limited to commercially available peroxide test strips, GC analysis, and titrations.

For embodiments performed during a plant shutdown, wherein the goal is to oxidize the preponderance of phosphine moieties in the catalyst solution, it will be necessary to add fresh polydentate phosphine ligand following the addition of peroxide. In some embodiments, fresh polydentate phosphine ligand is added so as to achieve a polydentate phosphine ligand concentration of 1-10 moles of ligand per mole rhodium; in additional embodiments 1-5 moles per rhodium, and in other embodiments 1.2-3 moles per rhodium. For embodiments performed within a running hydroformylation process, polydentate phosphine ligand concentration should be determined by HPLC, the rhodium amount should be determined by atomic absorption (AA), and additional ligand can be added as necessary to maintain the desired concentration.

Illustrative non-optically active aldehyde products that can be formed include e.g., propionaldehyde, n-butyraldehyde, isobutyraldehyde, n-valeraldehyde, 2-methyl 1-butyraldehyde, hexanal, hydroxyhexanal, 2-methyl 1-heptanal, nonanal, 2-methyl-1-octanal, decanal, adipaldehyde, 2-methylglutaraldehyde, 2-methyladipaldehyde, 3-hydroxypropionaldehyde, 6-hydroxyhexanal, alkenals, e.g., 2-, 3- and 4-pentenal, alkyl 5-formylvalerate, 2-methyl-1-nonanal, 2-methyl 1-decanal, 3-propyl-1-undecanal, pentadecanal, 3-propyl-1-hexadecanal, eicosanal, 2-methyl-1-tricosanal, pentacosanal, 2-methyl-1-tetracosanal, nonacosanal, 2-methyl-1-octacosanal, hentriacontanal, and 2-methyl-1-triacontanal.

Illustrative optically active aldehyde products include (enantiomeric) aldehyde compounds prepared by the asymmetric hydroformylation process of this invention such as, e.g. S-2-(p-isobutylphenyl)-propionaldehyde, S-2-(6-methoxy-2-naphthyl)propionaldehyde, S-2-(3-benzoylphenyl)-propionaldehyde, S-2-(3-fluoro-4-phenyl)phenylpropionaldehyde, S-2-(2-methylacetaldehyde)-5-benzoylthiophene and the like.

Some embodiments of the present invention will now be described in the following Examples.

EXAMPLES

All parts and percentages in the following examples are by weight unless otherwise indicated. Pressures are given as pounds per square inch gauge (psig) unless otherwise indicated. Rhodium concentrations are determined by Atomic Absorption (AA). Polydentate phosphine ligand concentration is determined by reverse-phase HPLC.

A solution of tetrahydrofuran hydroperoxide (THF hydroperoxide) is prepared by exposing THF to air. THF hydroperoxide concentration is determined via titration (spectrophotometric determination using ferrothiocyanate and $FeCl_3$ in methanol versus a calibration curve); 1.9 wt % THF hydroperoxide in THF is indicated. Solutions of t-butyl hydroperoxide in water (70 wt %) and in nonane (5-6 M) are purchased from Aldrich and used as received. Benzoyl peroxide (solid; 75 wt % with balance of water) and hydrogen peroxide (30 wt % in water) are purchased from Aldrich and used as received. Ligand A, a polydentate phosphine ligand among those disclosed in U.S. Pat. No. 7,531,698, is used in these Examples:

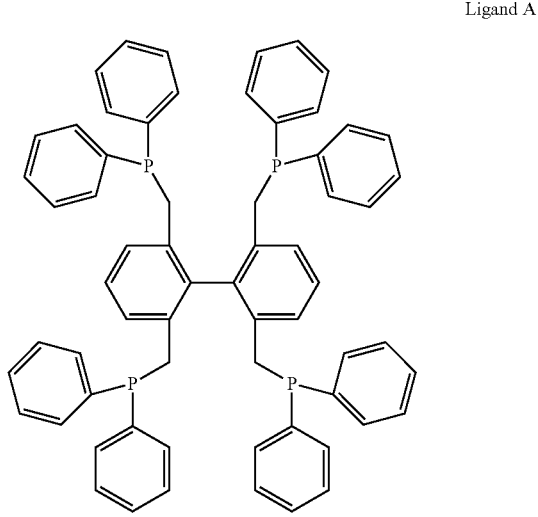 [SMILES: c1ccc(P(Cc2cccc(CP(c3ccccc3)c3ccccc3)c2-c2c(CP(c3ccccc3)c3ccccc3)cccc2CP(c2ccccc2)c2ccccc2)c2ccccc2)cc1]

Ligand A

General Procedure

Hydroformylation Test Unit description—A liquid recycle reactor system consists of three 1 liter stainless steel stirred tank reactors connected in series. Each reactor is equipped with a vertically mounted agitator and a circular tubular sparger located near the bottom of the reactor. Each sparger contains a plurality of holes of sufficient size to provide the desired gas flow into the liquid body in the reactor. The spargers are used for feeding the olefin and/or syngas to the reactor, and can also be used to recycle unreacted gases to each reactor. Each reactor has a silicone oil shell as a means of controlling reactor temperature. Reactors 1 to 2 and reactors 2 to 3 are further connected via lines to transfer any unreacted gases and lines to allow a portion of the liquid solution containing aldehyde product and catalyst to be pumped from reactor 1 to reactor 2 and from reactor 2 to reactor 3. Hence, the unreacted olefin of reactor 1 is further hydroformylated in reactor 2 and subsequently reactor 3. Each reactor also contains a pneumatic liquid level controller for maintaining the desired liquid level. Reactor 3 has a blow-off vent for removal of unreacted gases. A portion of the liquid reaction solution is continuously pumped from Reactor 3 to a vaporizer, which consists of a heated vessel at reduced pressure. The effluent stream from the vaporizer is sent to a gas-liquid separator located at the bottom of the vaporizer, where vaporized aldehyde is separated from the non-volatile components of the liquid reaction solution. The vaporized aldehyde product is condensed and collected in a product receiver. A pneumatic liquid level controller controls the desired non-volatile component level, including catalyst to be recycled, at the bottom of the separator.

Glass Reactor description—Hydroformylation Examples and Comparative Experiments are conducted in 90 mL flow-through Fisher Porter reactors equipped with means for accurate control of temperatures and gas flows. Mixing in the flow-through reactor is effected by continuous gas flow via a sparger at the bottom of the reactor. This reactor design is described in detail in U.S. Pat. No. 5,731,472, the teachings of which are incorporated by reference. Hydroformylation conditions are 100 psig 1:1 syn gas, 5-10 psig propylene, 150 psig total pressure (balance nitrogen) at 100° C. unless otherwise indicated. Reactor off gases are analyzed by online GC to determine partial pressures and product selectivity; and to allow calculation of reaction rates using Dalton's Law. Reaction rates are expressed as the moles of aldehyde produced per volume of catalyst solution per unit time (moles/L-hour); this value is additionally divided by the propylene partial pressure to help dampen the effects of small, unavoidable fluctuations in the propylene feed rate (rate/olefin). Product selectivity is expressed as the ratio of linear (normal) aldehyde versus branched (iso) aldehyde (N:I). In general, the linear product is the most desired, thus for the current invention a demonstrated increase in N:I is considered to be an improvement in catalyst performance.

Aliquots of the following deactivated catalyst solutions are used for some Examples and Comparative Experiments:

Catalyst Solution A—

Catalyst solution comprised of rhodium and Ligand A is charged to the Hydroformylation Test Unit and used for the hydroformylation of propylene for under varying conditions for a prolonged period of time. During the course of the run the hydroformylation rate demonstrated by the catalyst declines to less than 40% of a fresh rhodium-Ligand A catalyst under comparable concentrations and reaction conditions. The total phosphorous content is determined by XRF to be 0.025M.

Catalyst Solution B—

Catalyst solution comprised of rhodium and Ligand A is charged to the Hydroformylation Test Unit and used for the hydroformylation of propylene under varying conditions for a prolonged period of time. During the course of the run the hydroformylation rate demonstrated by the catalyst declines to less than 50% of a fresh rhodium-Ligand A catalyst under comparable concentrations and reaction conditions. The total phosphorous content is determined by XRF to be 0.039M.

Catalyst Solution C—
same as Catalyst Solution B with the exception of being more dilute; the rhodium and total phosphorous concentrations of Catalyst Solution C are about 40% relative to Catalyst Solution B.

Example 1

Catalyst Solution A (30 mL) is added to a Glass Reactor, and the excess butyraldehyde is stripped off at 100° C. under flowing syn gas. Tetraglyme (10 mL) is then added to give a final volume of 20 mL (final rhodium concentration is about 500 ppm). THF hydroperoxide (0.49 mmol in 3 mL of THF; 0.016M final peroxide concentration) is added, whereupon the solution turns from a clear yellow to a clear light brown almost immediately. After approximately 5 minutes, a solution of Ligand A in toluene is added (1.3 equivalents of Ligand A per rhodium) which results in a noticeable lightening in color. Flows of carbon monoxide, hydrogen and propylene are established and catalyst performance is determined.

Example 2

The procedure of Example 1 is repeated with the exception of the use of Catalyst Solution B and the amount of THF hydroperoxide added (0.32 mmol; 0.010M final peroxide concentration).

Example 3

The procedure of Example 1 is repeated with the exception of the use of t-butyl hydroperoxide (aqueous solution, 0.49 mmol; 0.016M final peroxide concentration), and waiting longer before adding the fresh Ligand A (3 hours).

Example 4

The procedure of Example 3 is repeated with the exception of adding t-butyl hydroperoxide as a nonane solution (0.49 mmol; 0.016M final peroxide concentration).

Example 5

The procedure of Example 3 is repeated with the exception of the amount of t-butyl peroxide added (0.97 mmol; 0.032M final peroxide concentration) and the amount of time prior to addition of the fresh Ligand A (30 minutes).

Example 6

The procedure of Example 5 is repeated with the exception of employing t-butyl hydroperoxide as a nonane solution.

Comparative Experiment A

Catalyst Solution A (30 mL) is added to a Glass Reactor, and the excess butyraldehyde is stripped off at 100° C. under flowing syn gas. Tetraglyme (10 mL) is then added to give a final volume of 20 mL (final rhodium concentration is about 500 ppm). A solution of Ligand A in toluene is added (1.5 equivalents of Ligand A per rhodium). Flows of carbon monoxide, hydrogen and propylene are established and catalyst performance is determined.

Comparative Experiment B

Catalyst Solution B (30 mL) is added to a Glass Reactor, and the excess butyraldehyde is stripped off at 100° C. under flowing syn gas. Tetraglyme (10 mL) is then added to give a final volume of 20 mL (final rhodium concentration is about 500 ppm). A solution of Ligand A in toluene is added (1.5 equivalents of Ligand A per rhodium. Flows of carbon monoxide, hydrogen and propylene are established and catalyst performance is determined.

The results of Examples 1-6 along with Comparative Experiments A and B are summarized in Table 1.

TABLE 1

| | Catalyst solution | peroxide | final peroxide conc. (M) | Time til Ligand A added | Fresh ligand A (mole/mole Rh) | rate/olefin | N:I |
|---|---|---|---|---|---|---|---|
| Comp Exp A | A | none | 0 | 0 | 1.5 | 0.125 | 21.4 |
| Comp Exp B | B | none | 0 | 0 | 1.5 | 0.084 | 19.5 |
| Ex. 1 | A | THF hydroperoxide | 0.016 | 5 | 1.3 | 0.248 | 26.0 |
| Ex. 2 | B | THF hydroperoxide | 0.010 | 5 | 1.3 | 0.214 | 25.0 |
| Ex. 3 | A | t-butyl hydroperoxide (nonane soln) | 0.016 | 180 | 1.3 | 0.196 | 23.5 |
| Ex. 4 | A | t-butyl hydroperoxide (aq soln) | 0.016 | 180 | 1.3 | 0.197 | 24.0 |
| Ex. 5 | A | t-butyl hydroperoxide (nonane soln) | 0.032 | 30 | 1.3 | 0.210 | 24.6 |
| Ex. 6 | A | t-butyl hydroperoxide (aq soln) | 0.032 | 30 | 1.3 | 0.220 | 24.5 |

The results of Table 1 clearly show the benefit of the embodiments of the inventive processes of Examples 1-6. Both the reaction rates and N:I for each of Examples 1-6 are significantly improved relative to the Comparative Examples. Moreover the treatment is tolerant of variations in the absolute amount and type of peroxide added, as well as the residence time prior to Ligand A addition.

Example 7

Catalyst Solution A (30 mL) is combined with THF hydroperoxide (1.20 mmol; 0.040M final concentration) at room temperature. The resulting mixture is stirred at room temperature for 5 days, after which a color change from yellow to clear light brown is observed. Fresh Ligand A (2 moles/mole rhodium) and tetraglyme (10 mL) are added, and the solution is charged to a Glass Reactor. After concentrating under flowing syn gas at 100° C. for about 14 hours, hydroformylation is initiated.

Examples 8A-8c

The procedure of Example 7 is repeated with the exception of the use of t-butylhydroperoxide and employing a larger volume of Catalyst Solution A (105 mL). This allows 30 mL aliquots to be removed for hydroformylation testing at 1 day (8a), 3 days (8b) and 5 days (8c).

The results of Examples 7 and 8a-c are summarized in Table 2.

TABLE 2

| | Catalyst solution | peroxide | final peroxide conc. (M) | Days til Ligand A added | Fresh ligand A (mole/mole Rh) | rate/olefin | N:I |
|---|---|---|---|---|---|---|---|
| Comp Exp A | A | none | 0 | 0 | 1.5 | 0.125 | 21.4 |
| Ex. 7 | A | THF hydroperoxide | 0.040 | 5 | 2.0 | 0.221 | 24.9 |
| Ex. 8a | A | t-butyl hydroperoxide | 0.040 | 1 | 2.0 | 0.196 | 21.3 |
| Ex. 8b | A | t-butyl hydroperoxide | 0.040 | 3 | 2.0 | 0.200 | 21.9 |
| Ex. 8c | A | t-butyl hydroperoxide | 0.040 | 5 | 2.0 | 0.242 | 22.2 |

The results of Table 2 show that the treatment according to embodiments of the present invention can be conducted at room temperature and without first concentrating the catalyst solution.

Example 9

Three liters of partially deactivated catalyst solution comprising rhodium, Ligand A and Ligand A degradation products is concentrated within the Hydroformylation Test Unit under flowing syn gas at about 80° C. to remove residual aldehyde. The catalyst solution had become partially deactivated after operation for a prolonged period of time in the Hydroformylation Test Unit. The concentrated solution (1271 g; 193 ppm rhodium) is transferred to a one gallon glass jug and stirred at room temperature, whereupon t-butyl hydroperoxide (70% in water; 8 mL, 0.04 M final peroxide concentration) is added slowly via syringe. No sign of reaction occurs during the peroxide addition. The resulting mixture is stirred at room temperature for about 112 hours.

$^{31}$P NMR spectra of the catalyst solution before and after treatment show assorted phosphine moieties including Ligand A and Ligand A degradation products in the catalyst solution prior to treatment, along with a paucity of these same phosphine moieties in the treated solution.

Fresh Ligand A (2 moles/mole rhodium) is then added, and the catalyst solution is returned to the Hydroformylation Test Unit. After stirring for approximately 60 minutes under syn gas at 90° C., hydroformylation is reinitiated; a 70% increase in hydroformylation rate and an improvement in N:I (16.5 N:I before treatment compared to 19.5 after treatment) are demonstrated.

Comparative Experiments C,D

Catalyst Solution A (30 mL) is added to each of two Glass Reactors at 100° C. Syn gas flow is initiated, and without concentrating the catalyst by removing residual aldehyde, THF hydroperoxide (0.013M final peroxide concentration) is added to one of the reactors. Fresh Ligand A (1.3 moles/mole rhodium) is added to each reactor within 5 minutes along with tetraglyme (10 mL). The solutions are maintained under flowing syn gas for about 3 hours after which time hydroformylation is initiated. The performance for both the treated and control catalyst solution are summarized in Table 3.

TABLE 3

| | Catalyst solution | peroxide | final peroxide conc. (M) | Time til Ligand A added | Fresh ligand A (mole/mole Rh) | rate/olefin | N:I |
|---|---|---|---|---|---|---|---|
| Comp Ex. C | A | 0 | 0 | 5 | 1.3 | 0.100 | 21.5 |
| Comp Ex. D | A | THf hydroperoxide | 0.013 | 5 | 1.3 | 0.030 | 2.2 |

Interestingly, the results of Table 3 show that the additions of peroxide at elevated temperature in the absence of pre-concentrating the catalyst is not only ineffective, but is deleterious to the catalyst.

Example 10a, 10b and Comparative Experiment e

Catalyst Solution C (25 mL) is added to each of three Glass Reactors along with tetraglyme (10 mL) at 100° C. Syn gas flow is initiated, and the catalyst is concentrated overnight by removing residual aldehyde; the resulting volumes are about 15 mL with a rhodium concentration of about 166 ppm. Hydroformylation is then initiated and dilute solutions of hydrogen peroxide and t-butyl hydroperoxide are added to Example 10a and 10b respectively (final peroxide concentration is 0.006M in each case); no peroxide is added to Comparative Experiment E. After 24 hours of continuous hydroformylation additional and comparable injections of the respective dilute peroxide solutions are made to 10a and 10b. No additional Ligand A is added to any of the solutions. The resulting hydroformylation rates and product regioselectivities are summarized in Table 4.

TABLE 4

| Days of operation | Comp. Exp. E | | Example 10a | | Example 10b | |
|---|---|---|---|---|---|---|
| | rate/olefin | N:I | rate/olefin | N:I | rate/olefin | N:I |
| 1 | 0.027 | 21.9 | 0.028 | 22.0 | 0.034 | 22.1 |
| 2 | 0.027 | 20.9 | 0.033 | 22.0 | 0.034 | 22.6 |
| 3 | 0.028 | 20.9 | 0.032 | 22.0 | 0.035 | 22.1 |
| 4 | 0.028 | 20.5 | 0.033 | 22.5 | 0.035 | 22.7 |

The results of Table 4 show the ability to improve the reaction rate and selectivity of the catalyst solution using the process of the invention; moreover the benefit is realized without interrupting continuous operation.

Taken collectively, the results presented herein demonstrate that the performance of an aged and deactivated hydroformylation catalyst comprised of rhodium, polydentate phosphine and polydentate phosphine degradation products can be greatly improved via the process of the invention.

What is claimed is:

1. A method to rejuvenate a deactivated hydroformylation catalyst solution comprising rhodium, polydentate phosphine ligands, and polydentate phosphine ligand degradation products, the method comprising: adding a peroxide to the deactivated hydroformylation catalyst solution.

2. The method of claim 1, further comprising adding additional polydentate phosphine ligand to the catalyst solution after the addition of peroxide.

3. The method of claim 1, wherein the temperature of the deactivated hydroformylation catalyst solution is between 0° C. and 40° C. when the peroxide is added.

4. The method of claim 1, wherein the deactivated hydroformylation catalyst solution further comprises at least one product aldehyde, and further comprising removing a majority of the product aldehyde prior to adding the peroxide.

5. The method of claim 4, wherein a majority of the product aldehyde is removed by vaporization.

6. The method of claim 4, wherein the temperature of the deactivated hydroformylation catalyst solution is 70° C. or greater when the peroxide is added.

7. The method of claim 4, wherein the temperature of the deactivated hydroformylation catalyst solution is 100° C. or greater when the peroxide is added.

8. The method of claim 4, wherein the peroxide comprises hydrogen peroxide, peroxy esters, peroxydicarbonates, dialkyl peroxides, hydroperoxides, peroxyketals, or a combination thereof.

* * * * *